UNITED STATES PATENT OFFICE.

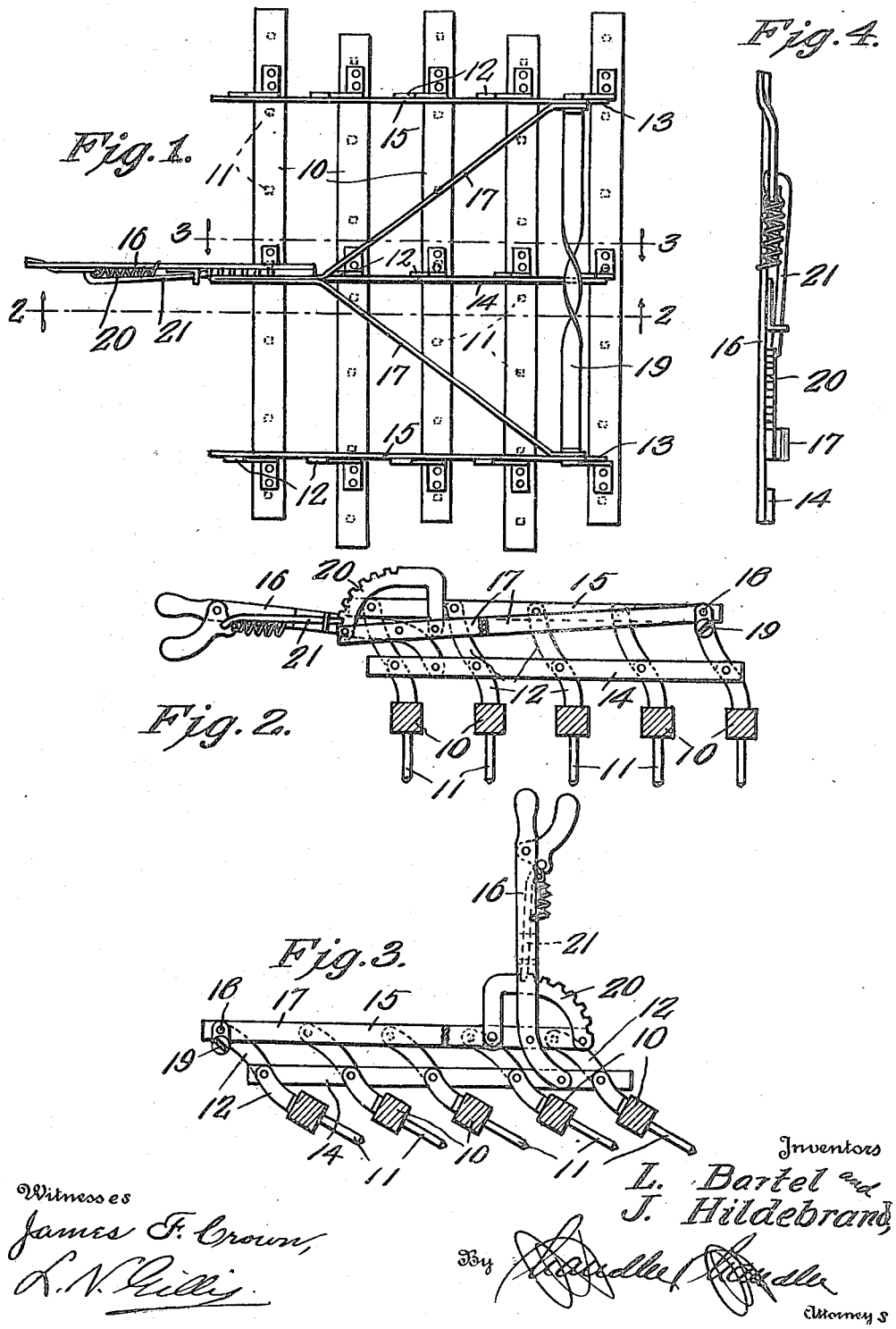

LEO BARTEL AND JOHN HILDEBRAND, OF FREMONT, WISCONSIN.

DRAG-HARROW.

1,222,918.	Specification of Letters Patent.	Patented Apr. 17, 1917.

Application filed June 16, 1916. Serial No. 104,080.

*To all whom it may concern:*

Be it known that we, LEO BARTEL and JOHN HILDEBRAND, citizens of the United States, residing at Fremont, in the county of Waupaca, State of Wisconsin, have invented certain new and useful Improvements in Drag-Harrows; and we do hereby declare the following to be a full, clear, and exact description of the invention, such as will enable others skilled in the art to which it appertains to make and use the same.

This invention relates to agricultural implements and has special reference to an improved form of drag harrow.

Experience has shown that in the ordinary use of the drag harrow wherein the clamping of the teeth is regulated from the center the device is very ineffective in clay or other heavy ground since the frame yields to the inequalities of the ground and becomes distorted so that it does not penetrate properly into the heavy ground.

The principal object of the present invention is to provide an improved form of harrow wherein the angular disposition of the teeth will be assured while at the same time the frame will be stiffened, so that the distortion thereof is prevented.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of a harrow constructed in accordance with this invention;

Fig. 2 is a section on the line 2—2 of Fig. 1, showing the harrow adjusted to have the teeth vertical;

Fig. 3 is a section on the line 3—3 of Fig. 1 showing the teeth in slanting position;

Fig. 4 is a detail view of the latch mechanism used herewith.

In the present embodiment of the invention there is disclosed a harrow consisting of a series of spaced cross bars 10 which are provided with teeth 11. Fixed to the centers and to points adjacent the ends of said bars and extending upward therefrom are arms 12. Extending longitudinally of the harrow are the lower side bars 13 and the center bar 14. Each of these bars is pivotally connected to the respective arms 12. Pivotally connected to the arms 12 at the ends of the cross bars 10 are the parallel bars 15 which are arranged above the side bars 13 so that a parallel motion frame is thus provided. Pivotally connected to the center bar, adjacent one end thereof is a lever 16 and this lever 16 is also pivoted to reach bars 17 which diverge and are pivotally connected as at 18 to the remote ends of the parallel bars 15. In order to prevent the movement of the parallel bars by these reach bars pulling in the connected ends of said parallel bars there is provided a brace bar 19 which connects these ends and holds the same in proper spaced relation.

Fixed to the reach bars concentric to the pivot of the lever is a quadrant 20 and on the lever is a latch 21 arranged to selectively engage the teeth of the quadrant.

By means of this construction, the movement of the lever 16 operates to simultaneously adjust both ends of the cross bars so that no twisting of the same is possible, and the harrow is thereby held from distortion. Furthermore, the triangular disposition of the reach bars and the cross bar makes an upper frame which is practically proof against distortion, under the law that the triangle is the only polygon which can not be distorted.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

A harrow consisting of a series of spaced cross bars provided with teeth, arms fixed to the centers and adjacent the ends of said bars and extending upward therefrom, longitudinal side and center bars each having one set of said arms connected pivotally thereto, parallel bars pivotally connected to the arms above the side bars, a lever pivotally connected to the center bar adjacent one end thereof, reach bars pivoted to the lever and having their ends diverging and pivotally connected to the remote ends of the parallel bars, a quadrant fixed to the reach bars concentric to the pivot of the lever and reach bars and coöperating with the lever, and a latch carried by said lever and engaging said quadrant.

In testimony whereof, we affix our signatures, in the presence of two witnesses.

LEO BARTEL.
JOHN HILDEBRAND.

Witnesses:
MYRTLE SMITH,
CHAS. MINK.

Copies of this patent may be obtained for five cents each, by addressing the "Commissioner of Patents, Washington, D. C."